United States Patent [19]

Abe et al.

[11] Patent Number: 4,612,902
[45] Date of Patent: Sep. 23, 1986

[54] KNOCKING CONTROL METHOD AND APPARATUS FOR INTERNAL COMBUSTION ENGINE

[75] Inventors: Osamu Abe, Katsuta; Noboru Sugiura, Mito, both of Japan

[73] Assignee: Hitachi, Ltd., Tokyo, Japan

[21] Appl. No.: 716,681

[22] Filed: Mar. 27, 1985

[30] Foreign Application Priority Data

Mar. 28, 1984 [JP] Japan .................................. 59-58300

[51] Int. Cl.⁴ ............................................. F02P 5/14
[52] U.S. Cl. .................................................. 123/425
[58] Field of Search ................... 123/425, 435

[56] References Cited

U.S. PATENT DOCUMENTS

| | | | |
|---|---|---|---|
| 4,282,841 | 8/1981 | Takagi et al. | 123/425 |
| 4,356,551 | 10/1982 | Iwase et al. | 123/425 X |
| 4,366,792 | 1/1983 | Deleris | 123/425 |
| 4,376,429 | 3/1983 | Youngblood | 123/425 |
| 4,413,599 | 11/1983 | Shigematsu et al. | 123/425 |
| 4,466,406 | 8/1984 | Hartung et al. | 123/425 |
| 4,483,295 | 11/1984 | Iida | 123/425 |
| 4,565,171 | 1/1986 | Sugiura et al. | 123/425 |

FOREIGN PATENT DOCUMENTS 0108462 7/1982 Japan .................................. 123/425

Primary Examiner—Willis R. Wolfe, Jr.
Attorney, Agent, or Firm—Antonelli, Terry & Wands

[57] ABSTRACT

A method and apparatus for controlling knocking in an internal combustion engine comprises the steps of detecting the knocking which occcurs in the internal combustion engine having a plurality of cylinders, correcting the ignition timing of a cylinder in which the knocking occurred, by a predetermined value based on the intensity of the knocking, and also correcting the ignition timing of the other cylinders by the predetermined value multiplied by certain coefficients.

8 Claims, 13 Drawing Figures

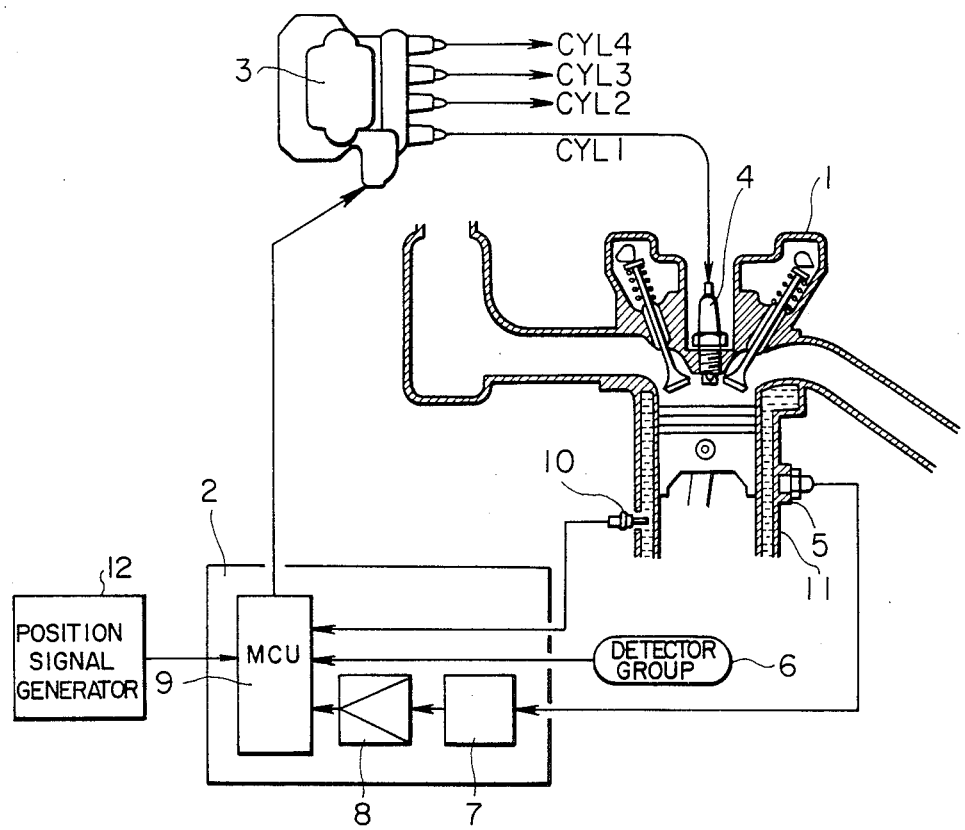

KNOCKING CONTROL METHOD AND APPARATUS FOR INTERNAL COMBUSTION ENGINE

BACKGROUND OF THE INVENTION

This invention relates to knocking control method and apparatus for an internal combustion engine, and particularly to a knocking control method and apparatus for an internal combustion engine which correct the ignition timing of the engine to thereby suppress knocking.

So far, combustion of a thin gas mixture or supercharging of suction air has been employed for improving the fuel economy or power per unit volume of cars.

However, when the engine of a car is operated in such a condition, knocking easily occurs and in some cases, the running performance of the car is deteriorated and the power of the engine is reduced, and in its turn the engine itself may be damaged. Therefore, in order to obviate these drawbacks, an ignition timing control apparatus is known in which knocking is detected and the ignition timing is suitably corrected to prevent continuation of the knocking.

This technique is disclosed, for example, in Japanese Patent KOKAI No. 58-144652 laid-open on Aug. 29, 1983 in which, when knocking occurs in the engine, the ignition timing is corrected according to the intensity of knocking and then all the cylinders are ignited equally at the corrected ignition timing. This control method does not solve, however, such a problem as caused by non-uniformity in combustion of fuel among the cylinders, that is, different knocking characteristics of the cylinders from each other due to differences in air-fuel ratio A/F, internal pressure and cylinder temperature among the cylinders. Thus, when knocking occurs only in a particular cylinder, the ignition timing of the other cylinders in which no knocking occurs is unnecessarily adjusted and as a result the overall power output of the engine is reduced. This is contrary to the original object.

SUMMARY OF THE INVENTION

It is an object of this invention to obviate the drawbacks of the prior art and to provide a knocking control method and apparatus capable of controlling the knocking so as to compensate for the differences in the knocking characteristics among the cylinders to thereby suppress continuation of knocking.

According to this invention, the ignition timing of any one of the cylinders in which knocking has occurred is corrected by an amount dependent on the intensity of knocking and the ignition timings of the other cylinders are corrected by the above-corrected amount multiplied by respective weighting coefficients determined according to the knocking characteristics of the respective cylinders.

Moreover, in a preferred embodiment of this invention, the weighting coefficients $\alpha$ are determined for the respective cylinders in accordance with the frequency in generation of knocking, thereby achieving more suitable knocking control.

BRIEF DESCRIPTION OF THE DRAWINGS

FIG. 1 shows the whole construction of one embodiment of this invention.

FIG. 2 shows the strokes of the 4-cylinder engine.

DESCRIPTION OF THE PREFERRED EMBODIMENTS

Figure 3:
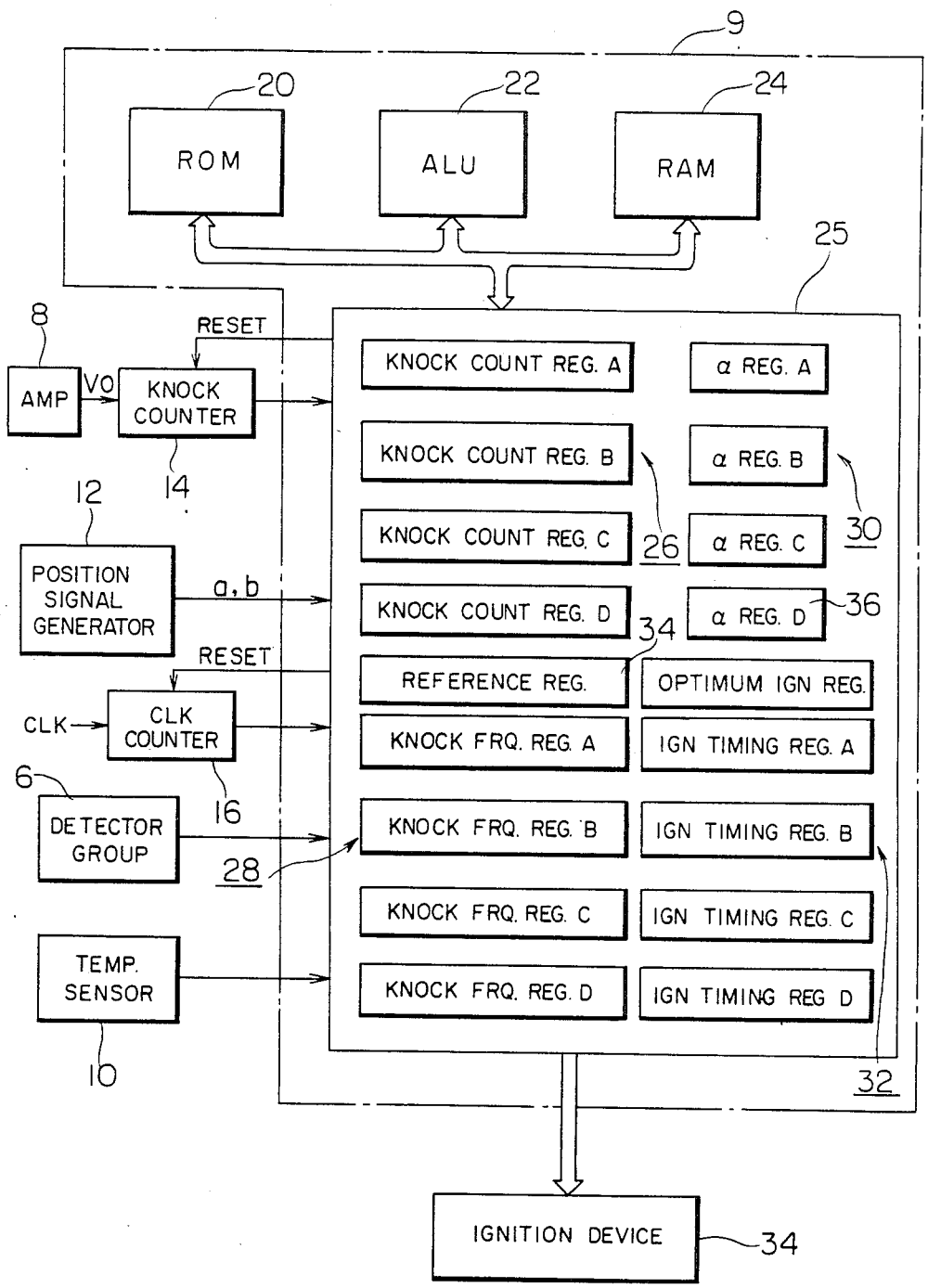
FIG. 3 is a block diagram showing the arrangement of the microcomputer MCU in FIG. 1.

FIG. 1 shows a general construction of one embodiment of the present invention applied to a four-cylinder engine 1, of which one cylinder is typically shown and the other cylinders are omitted. As well known, each cylinder of the engine 1 is provided with an ignition plug 4 at a predetermined position, to which a high voltage generated from an ignition coil 3 is supplied to ignite the mixture gas in the cylinder. Shown at 2 is a control unit which includes a microcomputer unit (MCU) 9, a band-pass filter (BPF) 7 and an amplifier 8. This control unit 2 is supplied with output signals from a temperature sensor 10, a detector group 6 for detecting the various parameters relating to engine operation such as the engine speed, pressure or amount of suction air and a position signal generator 12 connected to the crank shaft or cam shaft of the engine to generate position signals at predetermined positions of the respective cylinders and produces an ignition timing signal for controlling each cylinder of the engine 1 to operate in good condition. This ignition timing signal is supplied to the ignition coil 3 so as to control the engine 1. A knocking sensor 5 for detecting knocking is also mounted on a wall 11 of the engine 1. The knocking sensor 5 detects knocking from vibration noise produced by the engine. The frequency of the vibration noise due to knocking is generally in a range of 6–8 kHz and its amplitude varies depending on the intensity of knocking. The output signal from the sensor 5 is supplied to the band-pass filter BPF 7 of the control unit 2, so that, when knocking occurs, the ignition timing signal is corrected by this circuit arrangement thereby to suppress the knocking.

The ignition timings of the cylinders relative to strokes of a 4-cylinder engine are shown in FIG. 2.

The ignition is cyclically applied at a given crank angle of the engine to each of the cylinders CYL 1 to CYL 4. In this embodiment, the ignition is made in the order of CYL 1→CYL 3→CYL 4→CYL 2 and each cylinder makes ignition once in every four strokes.

Figure 4:
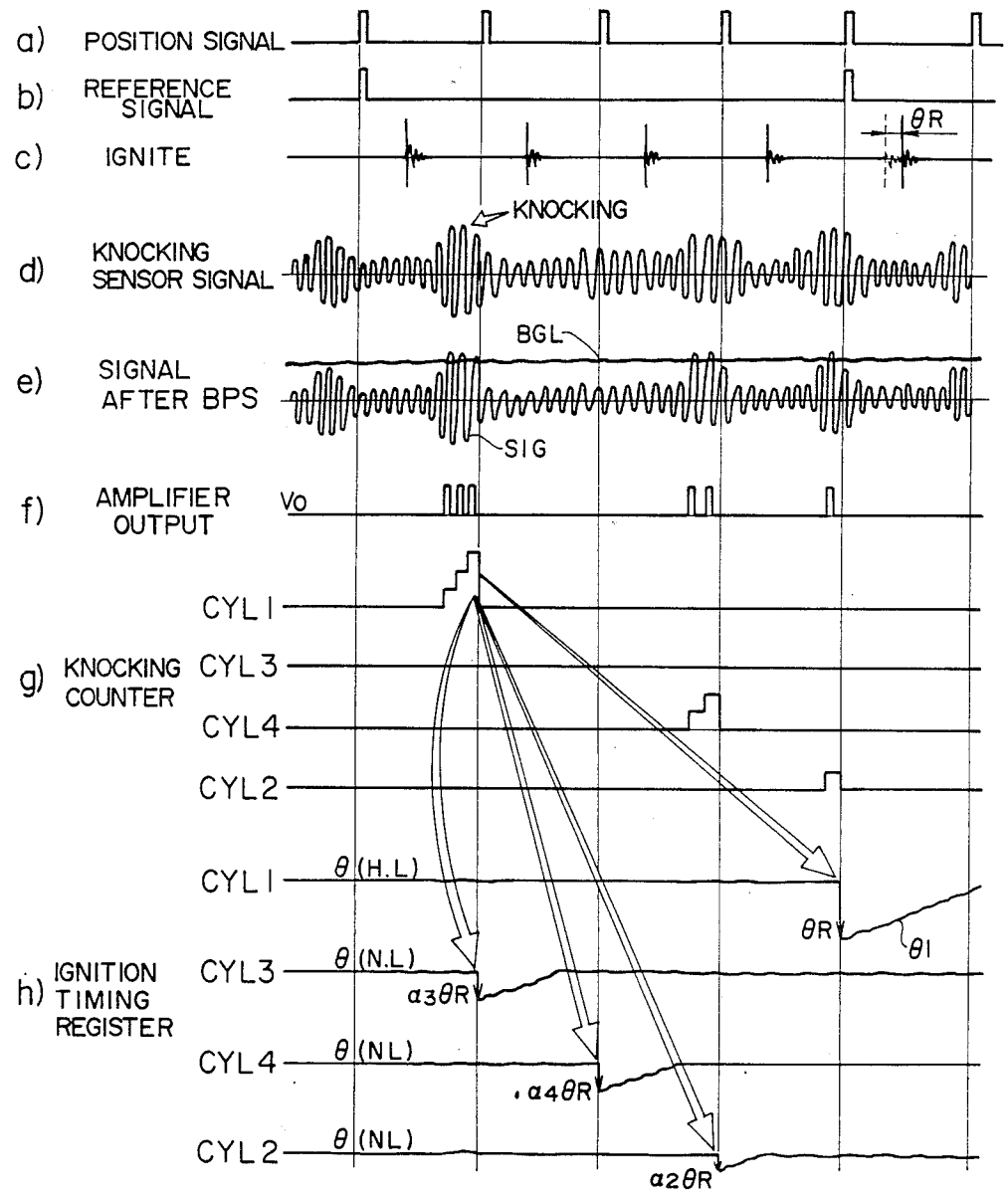
FIG. 4 is a timing chart for explaining the operation of the embodiment of FIG. 1.

The knocking control operation of the invention will be described with reference to FIGS. 3 and 4.

The position signal generator 12 may be any of well-known types which is connected to the crank shaft or cam shaft of the engine and produces position signals, as shown in FIG. 4(a), at predetermined degrees of angle in advance of the top dead points of the respective cylinders and a reference signal, as shown in FIG. 4(b) in synchronism with the position signal for one of the cylinders. The reference signal may be omitted if the position signal for one of the cylinders is made distinctive from the position signals for the other cylinders. This position signal is used to indicate a time when the corresponding cylinder passes the predetermined angular position, from which the ignition timing of that cylinder is determined. The reference signal is used to allot the position signals to the respective cylinders. The output signal from the knocking sensor 5 provided on the engine is a kind of alternating current, as shown in FIG. 4(d), and it is supplied to the BPF 7 of the control unit 2. The BPF 7 is a filter which allows the components of the output of the knock sensor 5 having the frequencies specific to knocking, for example, a frequency band around 7 kHz to pass therethrough and substantially blocks other frequency components. The signal passed through the BPF 7 has, as shown in FIG. 4(e), a waveform SIG in which the knocking frequency components are emphasized.

The signal from the BPF 7 is fed to the amplifier 8 which compares the signal with a background signal BGL having a predetermined level and produces, when the signal SIG is larger than the signal BGL, an output pulse signal Vo to be applied to the MCU 9. As the intensity of knocking is higher, the amplitude of the SIG signal is larger so that the number of peaks of the SIG signal higher than the BGL signal is greater. The output Vo is applied to a knock counter 14 which is provided in the control unit 2 and counts the number of peaks included in the output Vo larger than the BGL signal. The count value of the knock counter 14 is applied to an Input/out (I/O) device 25, which determines by using the position signals a and the reference signal b supplied from the position signal generator 12 which cylinder the output Vo has been derived from and sets the count value in a corresponding one of the knock count registers 26. For example, when it is determined that the output Vo has been derived from the cylinder 1 (CYL 1), the count value is set in the knock count register A. Simultaneously, the knocking counter 14 is reset and ready for counting the next knock output Vo. The knock count registers B, C and D are used for storing the count values derived from the cylinders 3, 4 and 2, respectively.

A clock counter 16 is provided to count frequency-divided clock pulses. The count value of the clock counter 16 is supplied to the I/O device 25 and used for correcting the ignition timing correction value, as will be described hereinafter. The detector group 6 includes various detectors producing signals indicative of engine operation parameters, respectively, such as engine speed, pressure or amount of suction air relating to the engine load and manifold temperature, which are applied to the I/O device 25. The MCU 9 includes the I/O device 25, ROM 20, arithmetic unit 22, and RAM 24 and executes logical processes on the input signals applied thereto according to a program stored in the ROM thereby obtaining correction values of the ignition timings for the respective cylinder.

Figure 7D:
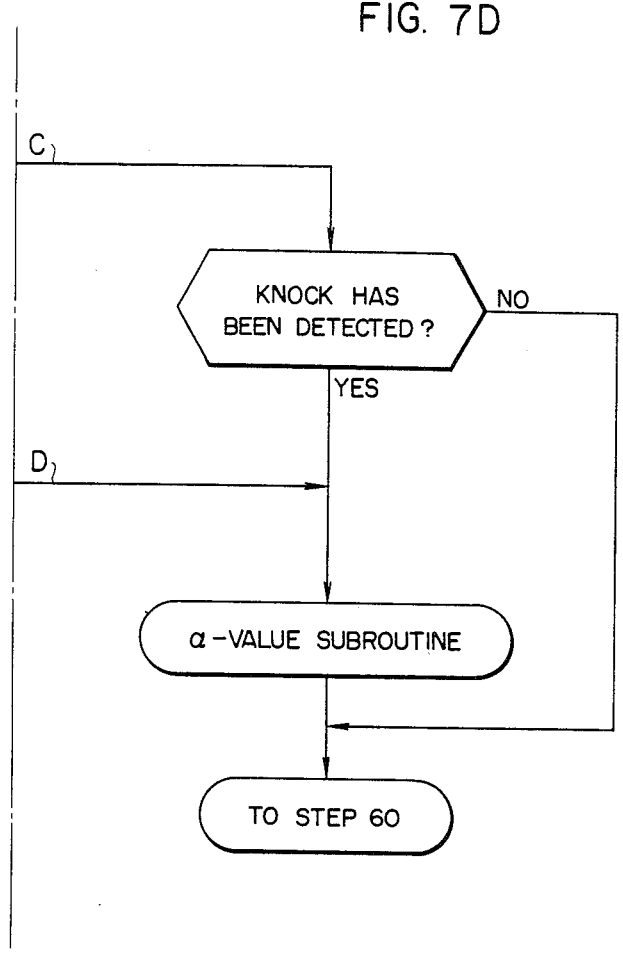
FIGS. 7, 7A–7D, 8 and 9 are flow charts of the process executed by the microcomputer.
Figure 7:
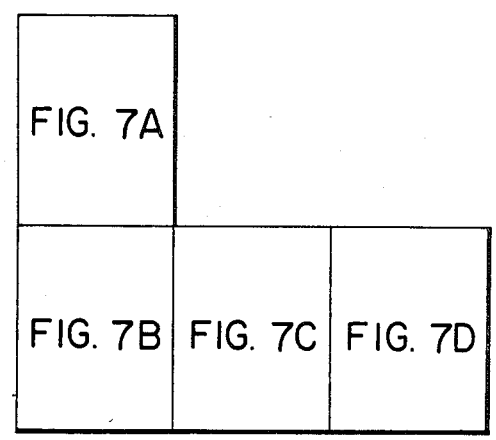
Figure 7A:
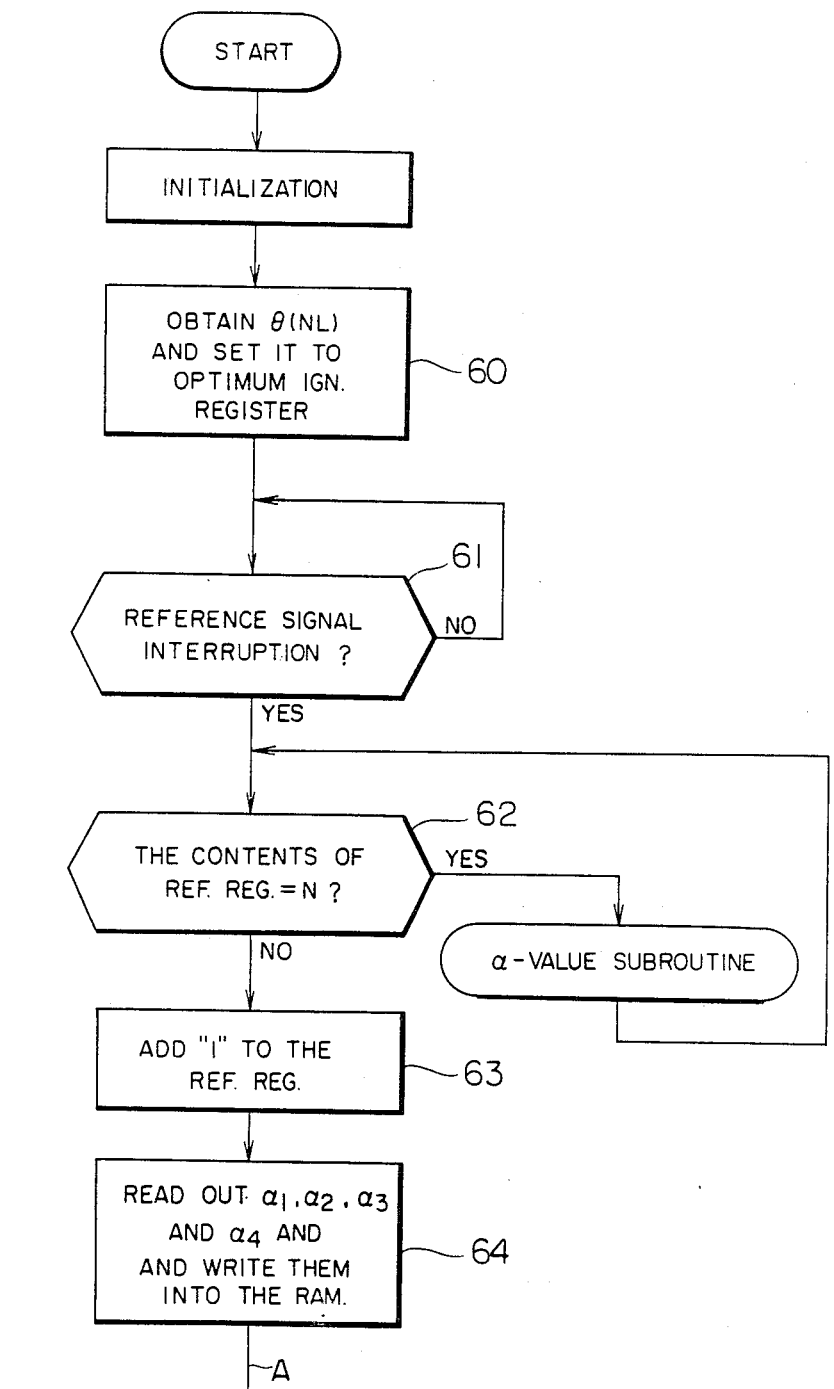
Figure 7B:
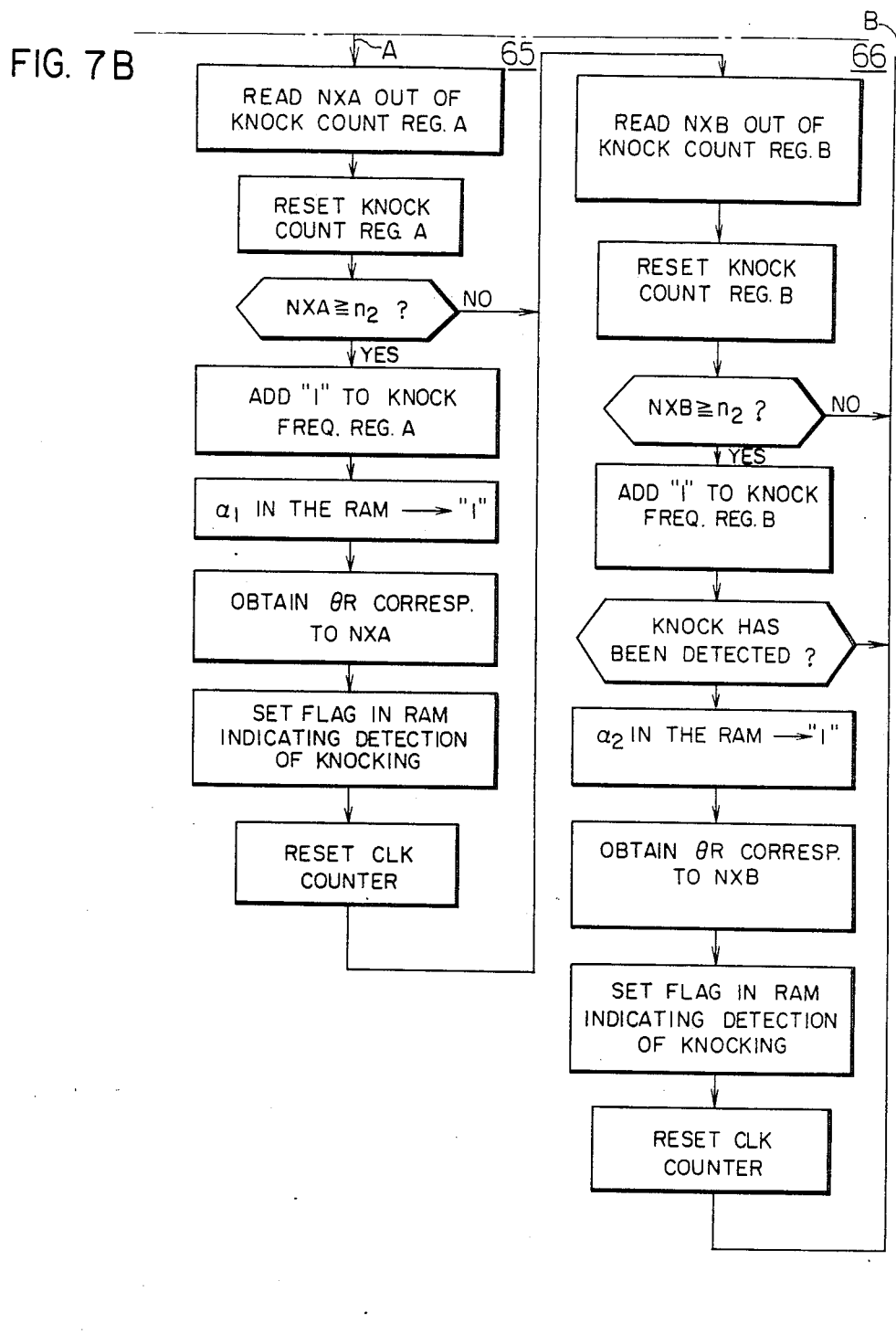
Figure 7C:
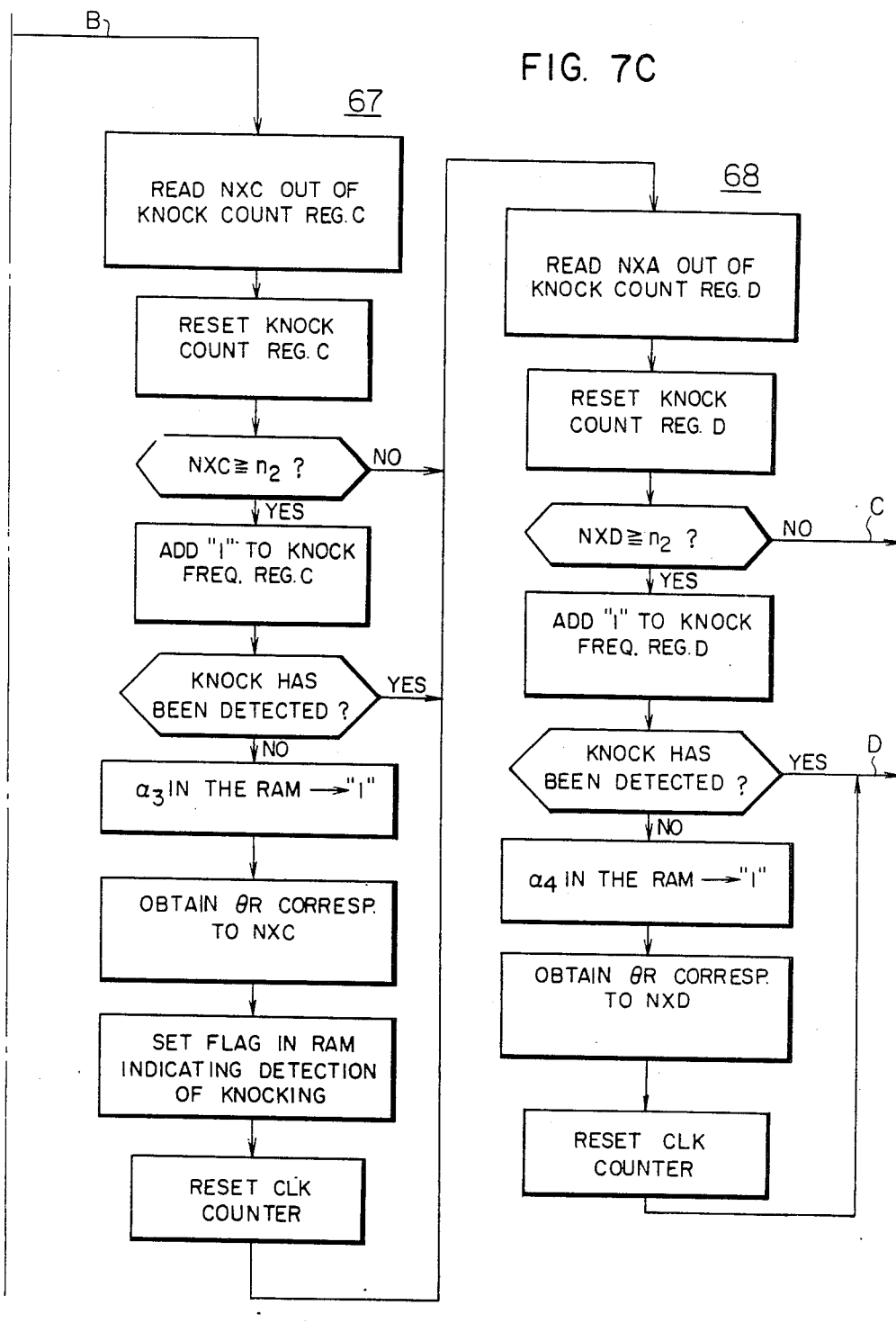
Figure 8:
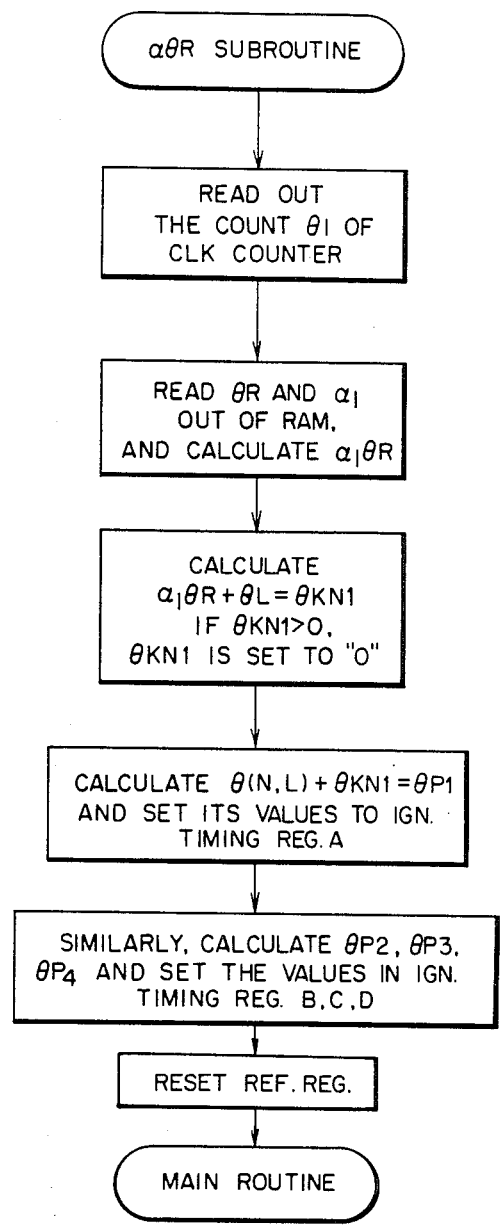
Figure 9:
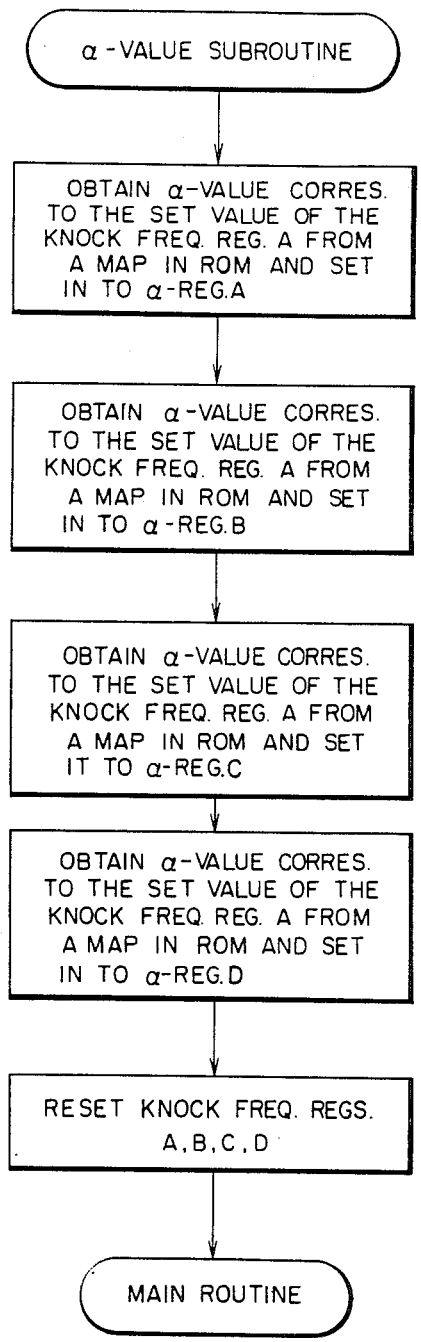

Now, the processes carried out by the MCU 9 will be explained by using the flow charts of FIGS. 7, 8 and 9. Upon closing an engine key switch to start the engine, an initialization is first carried out, as shown in FIG. 7, to reset to "0" the contents of various registers provided in the I/O device 25 and the counters. Next, in step 60, the optimum ignition timing $\theta$ (N, L) (advance angles from the top dead point of each cylinder) is obtained from a map stored in the ROM 20 based on the instant engine operating conditions such as the engine speed and the engine load supplied from the detector group 6 and the value of $\theta$ (N, L) is stored in an optimum ignition resistor 36. Then, in step 61, it awaits a reference signal interruption which is generated each time when the reference signal b is produced. When the interruption is detected, a step 62 is carried out to judge whether the set value of the reference register 34 is equal to a predetermined number N or not and if the former is equal to the latter, an $\alpha$-value subroutine, as described later, is carried out and then the process returns to the step 62. If the set value of the reference register 34 is not equal to N, "1" is added to the set value of the register 34. When the value of N is selected as "40", for example, the $\alpha$-value subroutine is carried out every 40 ignition times of each of the cylinders. As described hereinafter, the $\alpha$-value subroutine is a process for obtaining the weighting coefficients $\alpha$ of the respective cylinders as a function of the frequency of knocking which has occurred during a time interval corresponding to N times of ignition of each cylinder. It is desirable to select a larger value of N, so long as the operating condition of the engine is not expected to change during that time interval. In a step 64, the values of $\alpha_1$, $\alpha_2$, $\alpha_3$ and $\alpha_4$ which were calculated by the $\alpha$-value subroutine and stored in $\alpha$-registers A, B, C and D are read out and written into predetermined addresses of the RAM 24. Before first execution of the $\alpha$-value subroutine which occurs when the set value of the reference register 34 first reaches N, the contents of $\alpha$-registers A, B, C and D are all "0". However, explanation will be made of a case where the $\alpha$-value subroutine has been carried out at least one time, and the calculated values of $\alpha_1$, $\alpha_2$, $\alpha_3$ and $\alpha_4$ are stored in the respective $\alpha$-registers.

Next, a train of steps, shown by 65, relating to knocking of the cylinder 1 are carried out.

Figure 5:
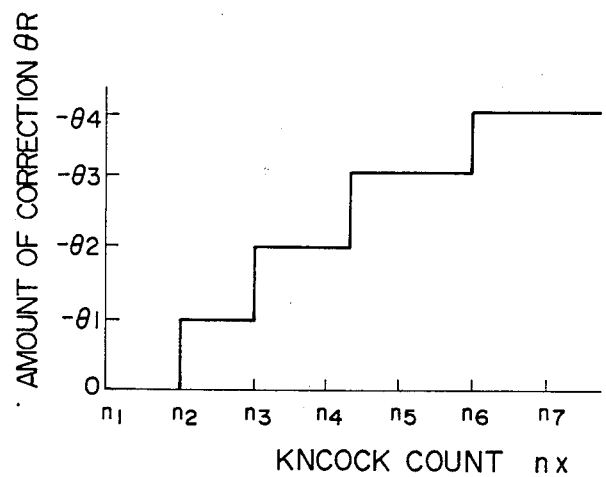
FIG. 5 is a graph showing the knocking count vs. amount of correction characteristic.
Figure 6:
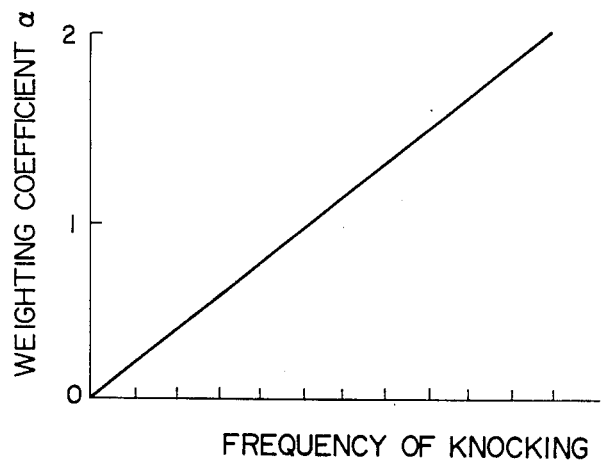
FIG. 6 is a graph showing the relation of weighting coefficient to the frequency of knocking.

Before explaining the steps 65, it will be useful for better understanding of the invention to explain the principle of knocking control of the present invention. Normally, the engine is controlled so that the ignition of the cylinders occurs at a timing corresponding to the optimum ignition timing $\theta$ (N, L) determined from the engine operation conditions. However, when knocking is detected, for example, in the cylinder 1, an ignition timing correction amount $\theta_R$ (negative value) is obtained according to the knock control correction characteristics as shown in FIG. 5 as a function of the intensity of knocking represented by the number of pulses NXA included in the knock output Vo shown in FIG. 4(f) and the ignition timing $\theta$ (N, L) of the cylinder 1 is corrected by $\theta_R$ (negative value) so that the succeeding ignitions occur at a timing corresponding to $\theta$(N, L)+$\theta_R$. On the other hand, the ignition timings of the other cylinders 3, 4 and 2 are corrected by $\alpha_2\theta_R$, $\alpha_3\theta_R$ and $\alpha_4\theta_R$ so that the succeeding ignitions of the cylinders 3, 4 and 2 occur at timings corresponding to $\theta$(N, L)+$\alpha_2\theta_R$, $\theta$(N, L)+$\alpha_3\theta_R$ and $\theta$(N, L)+$\alpha_4\theta_R$, respectively. In other words, when knocking is detected in any one of the cylinders, the ignition timing of the one cylinder is corrected by $\theta_R$ which is determined according to the intensity of the detected knocking represented by the value of NX, while the ignition timing of each of the other cylinders is corrected by $\alpha\theta_R$, where $\alpha$ is the weighting coefficient of the corresponding cylinder. The weighting coefficients $\alpha_1$, $\alpha_2$, $\alpha_3$ and $\alpha_4$ are obtained, in the preferred embodiment, by the $\alpha$-value subroutine according to the weighting coefficient characteristics, as shown in FIG. 6, as a function of the frequency of knockings, i.e. the number of occurrences of knocking during N times of ignition of the respective cylinders. Further, it is preferred to change the corrected ignition timing $\theta$(N, L)+$\theta_R$ or +$\alpha\theta_R$ at a predetermined time rate so that the corrected ignition timing returns to the optimum ignition timing $\theta$(N, L).

The steps 65 are employed for carrying out the process relating to knocking of the cylinder 1 on the basis of the above principle. First, the content NXA of the knock count register A, which is the number of pulses included in the knock output Vo derived from knocking occurred in the preceding ignition cycle of that cylinder and stored in the knock count register A, is read out and the knock count register A is reset. Next, the value of NXA is compared with a predetermined value $n_2$ and if NXA $\geq n_2$, it is determined that knocking has occurred in the cylinder 1 and "1" is added to the contents of the knock count register A. Then, the value of $\alpha_1$ written in the RAM is set to "1". This is required because the weighting coefficient is not used for the cylinder in which knocking has been detected. Next, the value of $\theta_R$ is obtained from a map stored in the ROM 20 and providing various values of $\theta_R$ corresponding to various values of NX according to the correction amount characteristics as shown in FIG. 5. Then the value of $\theta_R$, thus obtained, is set in a given address of the RAM 24, a flag showing that knocking has been detected is set in the RAM and the clock counter 16 is reset. Thereafter, the process proceeds to a train of steps 66 relating to knocking of the cylinder 3. The clock counter 16 counts frequency-divided clock pulses and the division ratio is selected so that the contents of the counter 16, i.e. the time-integration $\theta_I$ of the applied pulses, change at the predetermined time rate at which the corrected ignition timing $\theta(N, L) + \theta_R$ or $+\alpha\theta_R$ is changed as mentioned above. When the value of NXA is smaller than the value of $n_2$, it is judged that no knocking has occurred in the cylinder 1 and the process proceeds to a train the steps 66.

The steps 66 are substantially the same as the steps 65 except for an additional step for judging whether knocking has already been detected or not. If it is judged that knocking has been already detected in any preceding cylinder, the process preceeds immediately to a train of steps 67 relating to knocking in the cylinder 4. In a similar manner, the process preceeds from the steps 67 to a train of steps 68 relating to knocking of the cylinder 2. In one of the steps 68, if it is judged that the value of NXD is smaller than the value of $n_2$, a step is carried out for judging whether knocking has been already detected in any preceding cylinder. If the judgement is affirmative, the process proceeds to the $\alpha$-value subroutine, while if the judgement is negative, the process returns to the step 60. In this case, since no knocking has been detected in any of the cylinders, it is unnecessary to obtain a new value of $\theta_R$ and the correction of ignition timing is not carried out. As seen from the steps 68, when it is judged that knocking has occurred in any cylinder, the process returns to the step 60 after executing the $\alpha\theta_R$ subsroutine. Further, when knocking is first detected in one of the cylinders, the correction amount $\theta_R$ corresponding to the intensity of the detected knocking is obtained and the weighting coefficient $\alpha$ of that cylinder is set to "1", while the weighting coefficients of the other cylinders are maintained as the same as those values obtained by the $\alpha$-value subroutine.

Next, the process of the $\alpha\theta_R$ subroutine will be explained with reference to FIG. 8. First, the count value $\theta_I$ of the CLK counter 16 is read out and set in the RAM 24. The value of $\alpha_1\theta_R$ (negative) is calculated by using the values of $\theta_R$ and $\alpha_1$ set in the RAM. Next, the value of $\alpha_1\theta_R + \theta_1 = \theta_{KN1}$ is calculated. Just after detection of knocking, $\theta_1$ is substantially equal to "0" and hence $\alpha_1\theta_R = \theta_{KN1}$, which is used for correcting the ignition timing to be applied for the next ignition of the cylinder 1, as shown in FIG. 4. Thereafter, the value of $\theta_{KN1}$ is changed by the value of $\theta_1$ so that the value of $\theta_{KN1}$ returns to "0", so long as no knocking is detected thereafter. Since the value of $\theta_{KN1}$ (negative value) should be "0" or smaller than "0", the value of $\theta_{KN1}$ is set to "0", when the calculated value of $\alpha_1\theta_R + \theta_1$ is positive. Next, the value of $\theta(N, L) + \theta_{KN1} = \theta_{P1}$ is calculated and set in the ignition timing resister A. Similarly, the values of $\theta_{P2}$, $\theta_{P3}$, $\theta_{P4}$ are calculated and set in the ignition timing registers B, C and D, respectively. Then, the reference register 34 is reset and the process returns to the main routine.

In this manner, each time the reference signal b is produced, the ignition timing of each cylinder is corrected according to the knocking condition of each cylinder. The corrected ignition timings of the respective cylinders are set to the ignition timing registers A, B, C and D so that the ignition device 34 controls the ignition timings of the respective cylinders in the next ignition cycle by using the set values of the respective registers.

According to this invention, the scattering of the knocking phenomenon in the respective cylinders can be absorbed and a reduction in engine output can be prevented by the suppression of knocking, so that the saving of fuel can be effected by a thin gas mixture.

While, in this embodiment, the weighting coefficient for each cylinder is determined by the frequency of knocking in the corresponding cylinder, the weighting coefficients may be previously selected to be constants, under which substantially the same effect can be achieved.

We claim:

1. A method of controlling ignition timing of an internal combustion engine having a plurality of cylinders in which ignition occus sequentially in a predetermined order, comprising the steps of:
   (a) detecting the occurrence of a knocking condition in any one of said cylinders;
   (b) determining in which one of said cylinders said knocking condition has occurred;
   (c) producing a signal representative of the intensity of the detected knocking condition;
   (d) correcting the ignition timing of said any one cylinder based upon said knocking condition intensity representative signal; and
   (e) correcting the timings of ignition of those of said cylinders other than said any one cylinder by respective timing values dependent upon the intensity of said knocking condition representative signal adjusted by respective prescribed coefficients for said other cylinders.

2. A method according to claim 1, further comprising the steps of:
   determining the coefficients for the respective cylinders based upon the frequencies of occurrence of knocking conditions in the respective cylinders during a predetermined number of ignition cycles.

3. A method of controlling ignition timing of an internal combustion engine having a plurality of cylinders, comprising the steps of:
   (a) producing a first signal representative of the occurrence of a knocking condition in said engine;
   (b) producing a second signal in response to said first signal and representative of the intensity of the knocking condition represented by said first signal;

(c) identifying in which one of the cylinders the knocking condition represented by said first signal has occurred;

(d) correcting the timing of ignition in said one cylinder based upon said second signal; and (e) correcting the timings of ignition of those cylinders other than said one cylinder by respective timing values dependent upon said second signal adjusted by respective prescribed coefficient values for said other cylinders.

4. A method according to claim 3, wherein step (e) comprises determining ignition timing correction values for the respective cylinders based upon the frequencies of occurrence of knocking conditions in the respective cylinders during a predetermined number of ignition cycles.

5. An apparatus for controlling the ignition timing of an internal combustion engine having a plurality of cylinders on the basis of knocking which occurs in the engine, comprising:

a knock sensor mounted to the engine for detecting the occurrence of a knocking condition in the engine and producing a first signal representation thereof;

means for producing a second signal in response to said first signal and representative of the intensity of the knocking condition represented by said first signal;

means for determining in which one of said cylinders said knocking condition, as represented by said first signal, has occurred;

means for correcting the ignition timing of said one cylinder based on said second signal; and means for correcting the timing of ignition of those of said cylinders other than said one cylinder by respective timing values dependent upon said second signal adjusted by respective prescribed coefficients for the other cylinders.

6. An apparatus according to claim 5, further comprising means for determining the coefficient values for the respective cylinders based upon the frequencies of occurrence of knocking conditions, the respective cylinders during a predetermined number of ignition cycles.

7. An apparatus for controlling ignition timing of an engine having a plurality of cylinders, comprising:

knock detecting means for detecting the occurrence of a knocking condition in the engine and producing a knock signal representative of the intensity of the detected knocking conditions;

means for generating a position signal indicative of which one of the cylinders has been most recently subjected to an ignition operation;

means, responsive to said position signal, for detecting the magnitude of said knock signal upon the generation of said position signal;

means for correcting the timing of ignition in said one cylinder based on said detected magnitude of said knock signal; and means for correcting the timing of ignition of those of said cylinders other than said one cylinder by respective timing values dependent upon said detected magnitude of said knock signal adjusted by respective prescribed coefficient values for the other cylinders respectively.

8. An apparatus according to claim 7, further comprising means for determined ignition timing correction values for the respective cylinders based upon the frequencies of occurrence of knocking conditions in the respective cylinders during a predetermined number of ignition cycles.

* * * * *